United States Patent
Kakaraparthy et al.

(10) Patent No.: US 10,679,387 B2
(45) Date of Patent: Jun. 9, 2020

(54) COGNITIVE DRAWING ASSISTANT

(71) Applicant: International Business Machines Corporation, Armonk, NY (US)

(72) Inventors: Sreekanth L. Kakaraparthy, Bangalore (IN); Vijay A. Kumar, Bangalore (IN); Danish Contractor, Gurgaon (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/956,531

(22) Filed: Apr. 18, 2018

(65) Prior Publication Data

US 2019/0325623 A1   Oct. 24, 2019

(51) Int. Cl.
  *G06T 11/20* (2006.01)
  *G06F 3/0488* (2013.01)
  *G06F 3/0484* (2013.01)
  *G06K 9/00* (2006.01)

(52) U.S. Cl.
  CPC ........ *G06T 11/203* (2013.01); *G06F 3/04842* (2013.01); *G06F 3/04883* (2013.01); *G06K 9/00624* (2013.01)

(58) Field of Classification Search
  CPC .............. G06T 11/203; G06K 9/00624; G06F 3/04883; G06F 3/04842
  See application file for complete search history.

(56) References Cited

U.S. PATENT DOCUMENTS

| | | | |
|---|---|---|---|
| 9,035,953 | B1 | 5/2015 | Kukulski et al. |
| 2013/0223691 | A1 | 8/2013 | Paczkowski et al. |
| 2013/0239002 | A1* | 9/2013 | Maloney ............... G06F 17/211 |
| | | | 715/732 |
| 2014/0022345 | A1 | 1/2014 | Cho |
| 2017/0140241 | A1* | 5/2017 | Maloney .............. G06K 9/4652 |

OTHER PUBLICATIONS

Denning et al., "MeshFlow: Interactive Visualization of Mesh Construction Sequences", https://www.youtube.com/watch?v=0c3ouqKs4b4, 2016. (Year: 2016).*
Adobe, "The world's best photo editing SDK", Adobe, https://developers.aviary.com, [retrieved Apr. 17, 2018].
Github, "Awesome Deep Vision", GitHub, https://github.com/kjw0612/awesome-deep-vision, [retrieved Apr. 17, 2018].

(Continued)

*Primary Examiner* — Nicholas R Wilson
(74) *Attorney, Agent, or Firm* — North Shore Patents, P.C.; Joseph L. Acayan

(57) ABSTRACT

Embodiments generally relate to improving drawings. In some embodiments, a method includes receiving a drawing from a user, where the drawing includes one or more primary objects. The method further includes recognizing the one or more primary objects in the drawing, and determining properties of the one or more primary objects. The method further includes generating one or more suggestions for improvements to the drawing, where the one or more suggestions include one or more changes to the one or more properties. The method further includes receiving a version selection from the user, and rendering the drawing based on the version selection.

14 Claims, 5 Drawing Sheets

Original
300

Version 1
402

Version 2
404

Version 3
406

400

(56) References Cited

OTHER PUBLICATIONS

Kinderart, "Drawing Lessons for Kids", KinderArt, https://kinderart.com/category/art-lessons/drawing, [retrieved Apr. 17, 2018].

Mark A. Masry et al., "A sketch-based interface for iterative design and analysis of 3D objects", The Allen Institute for Artificial Intelligence, Semantic Scholar, https://pdfs.semanticscholar.org/d493/bb2b627f75410b9f0725795ff4c8e5d79a1b.pdf, 2005, [retrieved Apr. 17, 2018].

Mathworks, "Image Processing Toolbox Functions—by Category", MathWorks, http://in.mathworks.com/help/images/functionlist.html, [retrieved Apr. 17, 2018].

P. A. C. Varley et al., "Can Machines Interpret Line Drawings?", The Allen Institute for Artificial Intelligence, Semantic Scholar, https://pdfs.semanticscholar.org/7c48/ada8df70d76f119bd7a2486b0f6627e02391.pdf, 2004, [retrieved Apr. 17, 2018].

Rikard Rodin, "Creating Depth in Art and Photography", Zeven Design, http://zevendesign.com/creating-depth-art-photography/#linearperspective, Sep. 3, 2011.

Samarth Manoj Brahmbhatt, "Detecting partially occluded objects in images", GitHub, https://samarth-robo.github.io/research/masters_thesis.pdf, 2014, [retrieved Apr. 17, 2018].

Thomas F. Stahovich et al., "Generating Multiple New Designs From a Sketch", Association for the Advancement of Artificial Intelligence (AAAI), AAAI-96 Proceedings, pp. 1022-1029, http://www.aaai.org/Papers/AAAI/1996/AAAI96-152.pdf, 1996, [retrieved Apr. 17, 2018].

Tolga Kurtoglu et al., "Interpreting Schematic Sketches Using Physical Reasoning", Association for the Advancement of Artificial Intelligence, AAAI Technical Report SS-02-08https://www.aaai.org/Papers/Symposia/Spring/2002/SS-02-08/SS02-08-012.pdf, 2002, [retrieved Apr. 17, 2018].

Yusuke Matsui et al., "DrawFromDrawings: 2D Drawing Assistance via Stroke Interpolation with a Sketch Database", IEEE Transactions on Visualization and Computer Graphics, vol. 23, No. 7, pp. 1852-1862, Jul. 2017.

\* cited by examiner

US 10,679,387 B2

COGNITIVE DRAWING ASSISTANT

BACKGROUND

Various applications are available for sketching, drawing, and painting. Such applications provide rich capabilities such as layers that enable a user to define scenes, fill colors, textures, smoothen, and apply different effects. Methods used rely on image processing methods such as object boundary detection, tracking object contours, and more recently end-to-end deep learning methods. Users can use drawing applications on an electronic device such as a laptop, tablet, electronic sketch pad, which may use special electronic pens, regular touch screens, or mouse-like devices or other input devices for drawing. However, these applications do not provide feedback to a user for making improvements to a drawing.

SUMMARY

Disclosed herein is a method for improving drawings, and system and computer program product as specified in the independent claims. Embodiments are given in the dependent claims. Embodiments can be freely combined with each other if they are not mutually exclusive.

In some embodiments, a method includes receiving a drawing from a user, where the drawing includes one or more primary objects. The method further includes recognizing the one or more primary objects in the drawing, and determining properties of the one or more primary objects. The method further includes generating one or more suggestions for improvements to the drawing, where the one or more suggestions include one or more changes to the one or more properties. The method further includes receiving a version selection from the user, and rendering the drawing based on the version selection.

In another aspect, the one or more suggestions include applying one or more different modifications to the drawing. In another aspect, the at least one processor further performs operations including rendering one or more versions of the drawing on a display, and where each version of the drawing shows the drawing with changes to one or more properties. In another aspect, the at least one processor further performs operations including rendering previews of one or more versions of the drawing on a display, and where each version of the drawing shows the drawing with a different combination of modifications applied to the drawing. In another aspect, the at least one processor further performs operations including cycling different versions of the drawing on a display, and where each version of the drawing shows different combinations of changes to properties. In another aspect, the at least one processor further performs operations including: rendering one or more versions of the drawing on a display, and indicating changes made to the drawing. In another aspect, the at least one processor further performs operations including rendering one or more versions of the drawing on a display, and displaying text that describes the changes.

DETAILED DESCRIPTION

Figure 1:
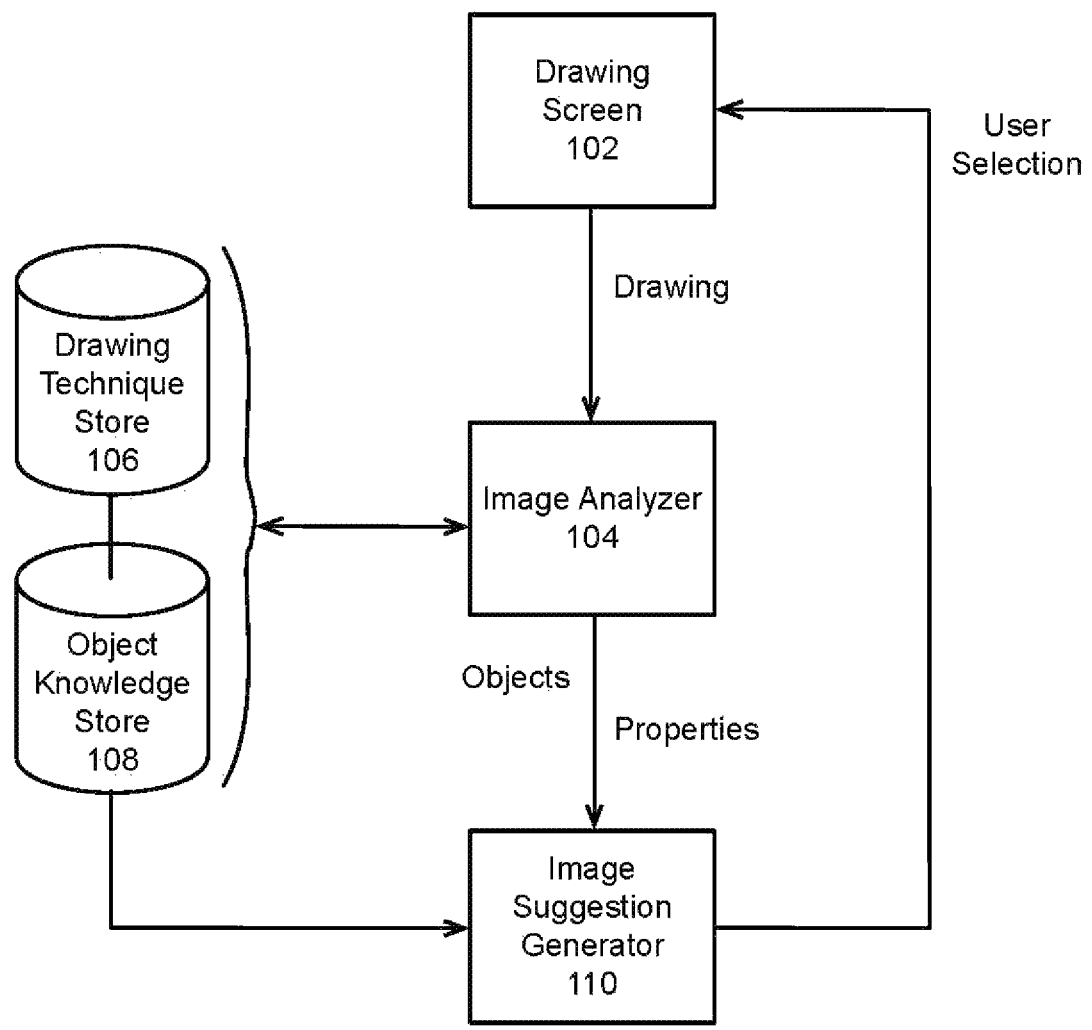
FIG. 1 is an example system for improving drawings, according to some embodiments.

Embodiments described herein facilitate improvements in drawings. Embodiments described herein provide a cognitive drawing assistant that analyzes the content of a drawing to suggest improvements to the drawing. For example, embodiments suggest how to improve scale, perspective, proportion, depth, and other aspects in drawings. This is especially beneficial for learners of drawing, such as young children.

In some embodiments, a system receives a drawing from a user, where the drawing includes one or more primary objects. The system recognizes the one or more primary objects in the drawing, and determines properties of the one or more primary objects. The system then generates one or more suggestions for improvements to the drawing, where the one or more suggestions include one or more changes to the one or more properties. The system receives a version selection from the user, and then renders the drawing based on the version selection.

FIG. 1 is an example system 100 for improving drawings, according to some embodiments. Shown are a display or drawing screen 102, an image analyzer 104, a drawing technique store 106, an object knowledge store 108, and an image suggestion generator 110. As described in more detail herein, the system 100 receives an image or drawing that a user sketches in the drawing screen 102. The terms drawing and image may be used interchangeably. In other implementations, environment 100 may not have all of the components shown and/or may have other elements including other types of elements instead of, or in addition to, those shown herein.

The image analyzer 104 of the system 100 uses object recognition and drawing technique analysis to identify objects in the drawing, characteristics of the objects, and analyzes the objects for depth occlusion, color effects for scene, etc.

Once objects have been identified, the image analyzer 104 detects objects that are in the foreground, objects in the background, and objects that are occluded, etc., and generates scene characteristics or properties. The properties may include object metadata (e.g., <Object, Object pixel co-ordinates, size_order_index>). In some embodiments, "Object" may be a label such as "tree". "Object pixel co-ordinates" may be provide a set of co-ordinates on the screen where the object has been drawn, that is, a few (x,y) points on the screen, and the part of the object drawn there. This approximately captures the shape of the object drawn. Further, a comparison of the expected shape of the object, and actual shape of the object, and expected and actual shape of other objects that use the same screen co-ordinate, an occlusion/in-front-of/behind position may be identified for each object, which directly maps to a z-dimension order of the elements. "Size_order_index" may capture the z-dimension (e.g., relative position front/behind—with respect to other objects) and the relative size of a real-world object in the aspect. The following is an example of relative size in the aspect. If a mango and a tree are shown of the same size, and the mango is not occluded by the tree. In some embodiments, the ratio of the sizes (which are effectively the relative sizes) will then not be readjusted. If the mango is partly occluded by the tree, then the size of the mango will be adjusted such that the mango is at least a threshold times smaller than the tree. The actual size of the mango may be determined by a trigonometric computation using a perceived distance of the mango from (behind) the tree to adjust the size of the mango. In some embodiments, the relative size-order index suggests relative real world sizes of the objects identified. The metadata may vary, depending on the particular implementation. Another example of metadata may include, Object 1, occulded_by/front of/behind, object 2.

The drawing technique store 106 may have functions to reshape, reposition, and reorder objects. For example, a set of reshape functions may be scale, change_texture, update_color, update_depth_change_color, etc. A reposition functions may be to update the image by rendering it at a different location of the image, and fill the "vacated area" (where the object earlier was). This may be achieved by using Gaussian or other smoothing techniques to approximately construct the background. This is done in case an object was detected to be occluded by the moved item. The object is reconstructed at the position using the object knowledge store 108, and only the zone of the image where the newly reconstructed object does not cover, is used for background construction. A reorder objects function may be to alter the z-index of multiple occluding objects, and to reconstruct the new object on the top using the object knowledge store. This is done while using the newly occupied coordinates of the new object on the top to occlude the space within those coordinates of the old object that was earlier on top but now behind.

The object knowledge store 108 stores sample images of various typical shapes. In some embodiments, the object knowledge store is trained using an object recognition deep learning model.

The image suggestion generator 110 generates different images by applying the different object scene modifications based on the scene characteristics. In some embodiments, if objects are occluded, the system may apply an occlusion and/or shadow color modification. For example, the image suggestion generator 110 may, in some cases, suggest reordering objects in the z-dimension. In those cases, if the new item on top is opaque, then the new item will be brought on top and the older item will be occluded. If the new item on top of the z-index is transparent/semi-transparent and depending upon the knowledge of transparency and illumination conditions inferred from the image (or using out-of-the-box illumination conditions), a shade of coloring/illumination (e.g., brightness) level (e.g., shadow) may be suggested. The system may determine which modification to apply based on knowledge, and the modification may be encoded as part of the drawing technique store. In some embodiments, the drawing technique store may have rules/functions that indicate the following: given a current color, and a given/inferred illumination condition, and given an identified object (and based upon the known transparency knowledge of the identified object present in the knowledge base), how to create a shade/coloring/illumination. In other words, the "knowledge" in the knowledge base may have inputs stored from human or artificial intelligence (AI) experts stored along with coloring/shadow meta-information. In some embodiments, if the coloring/shadow meta-information is not stored, the meta-information may be inferred using image processing techniques such as color gradient analysis techniques etc.

As described in more detail herein, after the user selects a version of the drawing, the image suggestion generator 110 of the system 100 renders the selected drawing in the drawing screen 102.

While the system 100 performs embodiments described herein, in other embodiments, any suitable component or combination of components associated with the system 100 or any suitable processor or processors or computer system (e.g., computer system of FIG. 5) associated with the system 100 may facilitate performing the embodiments described herein. In various embodiments, the system 100 may not have all of the components shown and/or may have other elements including other types of components instead of, or in addition to, those shown herein.

Figure 2:
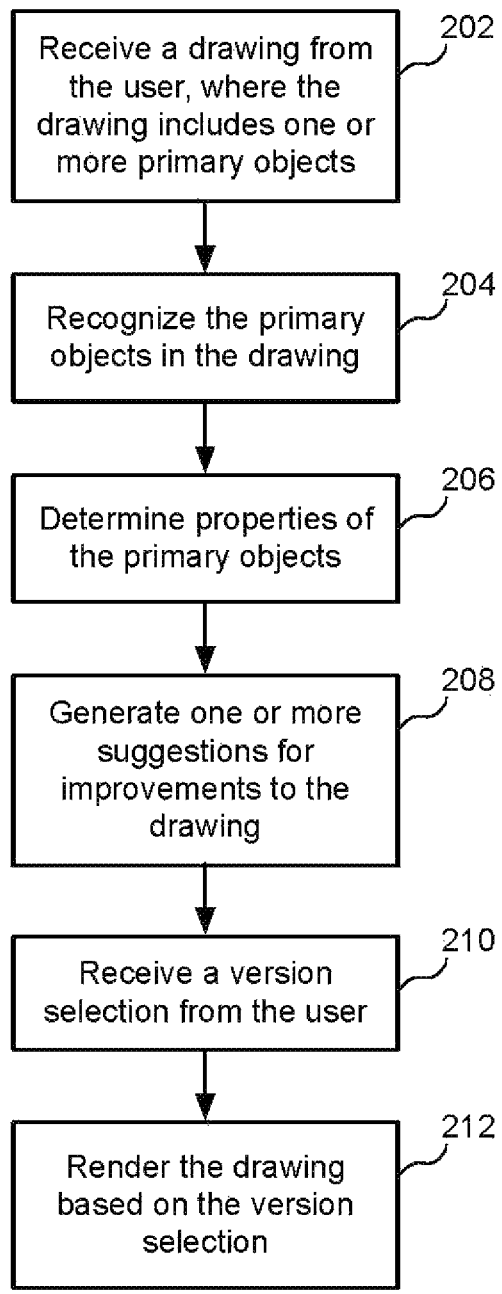
FIG. 2 is an example flow diagram for improving drawings, according to some embodiments.

FIG. 2 is an example flow diagram for improving drawings, according to some embodiments. Referring to both FIGS. 1 and 2, a method begins at block 202, where a system such as system 100 receives a drawing from the user. In some embodiments, the system may receive the drawing from a drawing module or drawing software program that is either integrated with the system or accessible by the system. For example, the user may draw a digital image on a screen using one or more input devices such as a touchscreen, stylus, and/or track pad, etc. The system may then access the drawing from memory. If the user uses drawing software to create the drawing, the system may import the drawing. The drawing received by the system may also include drawings that the user has modified, augmented, etc.

In some embodiments, the system 100 may receive a hard copy drawing sketch or hard copy image. Such a drawing may be sketched by hand or drawing offline (e.g., using other drawing software). For example, the user may scan a hard copy of the drawing. The system may then convert the image to an electronic version. In various embodiments, after the system 100 receives the drawing whether electronic or a hard copy, the system may manipulate the images in memory and render the images on the screen.

Figure 3:
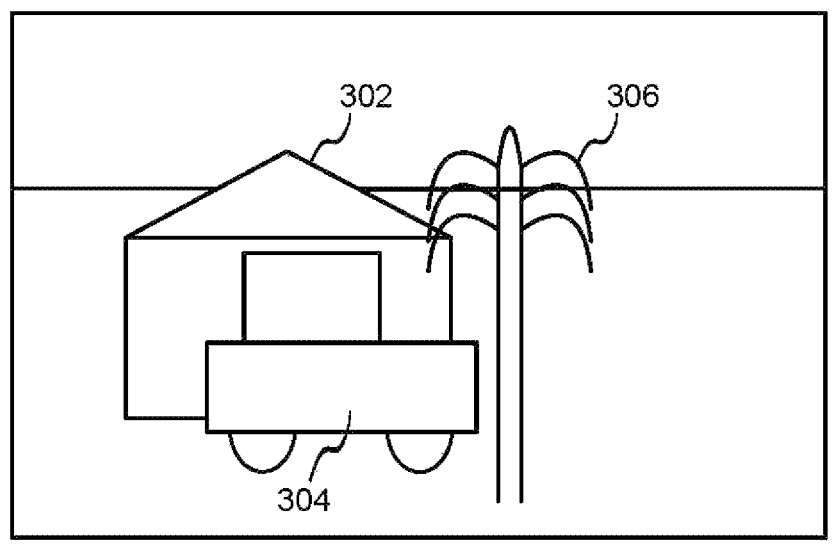
FIG. 3 is an example drawing including primary objects, according to some embodiments.

FIG. 3 is an example drawing 300 including primary objects, according to some embodiments. As shown, the drawing 300 includes one or more primary objects, which include a house 302, a car 304, and tree 306. For ease of illustration, the drawing 300 is abstract and shows three primary objects. Drawings and numbers of primary objects in a drawing may vary depending on the nature and style of the art drawn. For example, drawings may range from detailed, realistic drawings to abstract, non-realistic drawings.

At block 204 of FIG. 2, the system 100 recognizes the one or more primary objects in the drawing. As indicated herein, a given drawing may have multiple different objects within the drawing. The system may apply any suitable object recognition techniques to recognize the different primary objects on the screen. In various embodiments, primary objects may be mainstream objects drawn actively, while non-primary objects are simply background objects. The particular objects in a given drawing that may be deemed as primary objects may vary, and will depend on the particular implementation.

Referring again to FIG. 3, the system recognizes the primary objects, which include the house 302, the car 304, and the tree 306. Depending on the drawing, the primary objects may vary. For example, primary objects may include people, animals, including types of animals (e.g., dogs, cats, birds, etc.), vehicles, including types of vehicles (e.g., buses, cars, trucks, cycles, etc.), geographical features, including types of geographical features (e.g., mountains, lakes, roads, volcanoes, rail tracks, etc.), planets and solar system objects (e.g., stars, etc.), botanical elements, including types of botanical elements (e.g., trees, bushes, shrubs, etc.), etc.

At block 206, the system 100 determines properties of the one or more primary objects. In various embodiments, the system analyzes each of the primary objects such as the house 302, the car 304, and tree 306, and recognizes attributes or properties of those objects. For example, the system may perform a scene analysis, where the system analyzes the primary objects in the image/drawing for properties such as scale, depth, occlusion, texture, etc. In some embodiments, scale may refer to how are primary objects sized relative to other objects, relative proportions of objects, etc. Depth may refer to what primary objects are in the foreground, what primary objects are in the background, etc. In various embodiments, depth may be determined based on properties such as linear perspective, light, shadow, solidity, focus, color, etc. Occlusion may refer to whether part of an image is occluded due to an object being positioned in front, etc. As such, occlusion depends on the location of primary objects in the drawing. Texture may refer to the feel, appearance, and/or consistency of a primary object. In various embodiments, the system 100 also performs the same analysis on component objects of the primary objects (e.g., roof, doors, windows of a house, etc.).

In some embodiments, the system may generate descriptions of some or all of the properties of a given object (e.g., size, proportion, colors, textures, etc.). For example, suppose a mango that has been drawn in pure green. The knowledge store shows mangoes that are a mix of green and yellowish. The knowledge store also shows mangoes that are slightly green, vastly yellow and a bit reddish near the bottom. Further, the knowledge store shows that most mangoes are roundish while only few a tallish. Based on these meta-data, the drawing technique store's functions are applied and the image suggestion generator shows the different types of mangoes that could be generated by altering the shape and size of the mango already drawn by the person. Practically, since all types will not be feasible to show, some mangoes are prioritized and shown earlier, and the prioritization could happen using a preset policy present within the teaching guidelines. In some embodiments, the user may provide descriptions of some properties and corresponding property values of a given object. In some embodiments, the system may access properties from a knowledge store. Such properties may be stored in a database (DB) file, extensible markup language (XML) file, JavaScript Object Notation (JSON) file, etc.

At block 208, the system 100 generates one or more suggestions for improvements to the drawing, where the one or more suggestions include one or more changes to the one or more properties. In some embodiments, the modifying, reshaping, repositioning, and reordering algorithms may be applied to the objects and shown to the user.

In some embodiments, the one or more suggestions may include applying one or more different modifications to the drawing. For example, the system may show how the drawing would look if it were scaled or if it were colored for depth, etc. One or more modifications may be applied to a drawing to make the drawing more realistic. The modifications may be stored in the object knowledge store or other suitable storage location. The user may allow the system to run in a mode where the system constantly analyzes the drawing in order to make suggestions. Alternatively, the system may enable the user to turn off the suggestion functionality.

In various embodiments, to generate different suggestions, the system may render one or more alternative versions of the drawing on a display, where each version of the drawing shows the drawing with changes to one or more properties. In some embodiments, changes to the properties may be achieved by the system applying one or more modifications to the drawing, where a given modification adjusts values of one or more properties.

In various embodiments, the system prioritizes image recommendations based on a variety of factors, including confidence scores and probabilities of occlusion detection, include real-world knowledge of occluded objects, depth identified in images, color and texture of objects, etc. For example, the system may present recommendations based on aspects of size and depth, and domain knowledge, where the system ensures that a big object cannot occlude a small object unless the bigger object is transparent or unless the bigger object is at a lesser depth than the small object from the image view point.

In some embodiments, the system may determine a recommendation ranking based on a combination of such factors. The combination of such factors may vary, and will depend on the nature of recommendations in use and deployed. In some embodiments, these factors may be learned by training on sample images or by encoding parameters and domain knowledge (e.g., enforcing constraints so as to mimic real world knowledge) or something equivalent (e.g., strict exhaustive rule writing).

In some embodiments, the system may use color information to generate more realistic traits based on color. For example, the system may apply rules to objects based on color (e.g., mango cannot be red, etc.). In some embodiments, the system may use real-world object size information to generate more realistic traits. For example, the system may apply rules to object based on size (e.g., a shoe cannot be bigger than a building, etc.).

In various embodiments, the system provides choices to users and does not necessarily impose fully autonomous decision making, because art may not always be grounded in reality/realistic themes. In the context of art, objects may sometimes be drawn disproportionately large simply for focus, or to allude to a philosophical reference, for example. Embodiments described herein provide users with such flexibility.

In some embodiments, to modify properties of an object, the system may change the values of one or more properties of the object. For example, the system may change the scale value of the object relative to other objects (e.g., make the object smaller or larger). In another example, the system may change the orientation of the object relative to other objects. In another example, the system may change the depth value of the object relative to other objects. In another example, the system may change the occlusion of the object relative to other objects. In another example, the system may move the object into the foreground or background relative to other objects. The particular properties that the system changes and the degree to which the system changes the properties may vary and will depend on the particular implementation.

Figure 4:
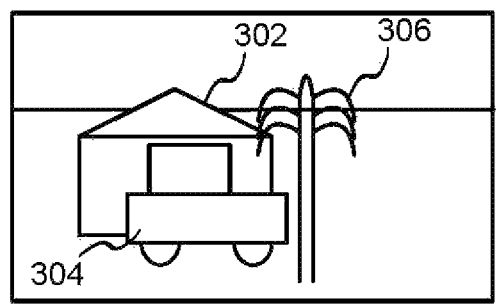
FIG. 4 is an example layout of drawing versions, according to some embodiments.
Figure 4:
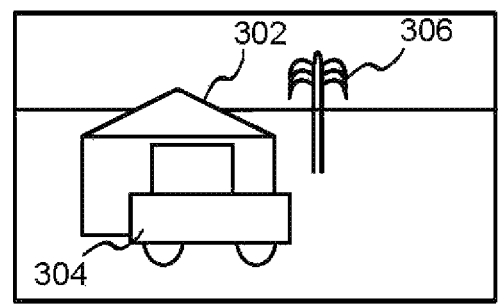
Figure 4:
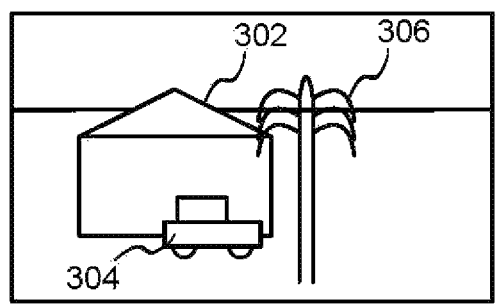
Figure 4:
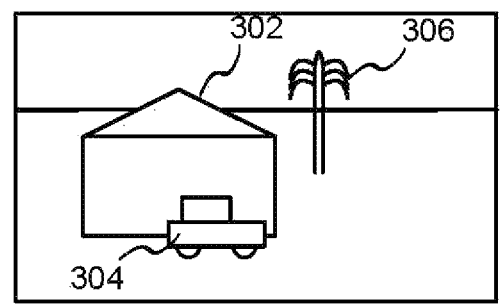

FIG. 4 is an example layout 400 of drawing versions, according to some embodiments. As shown, the layout 400 includes the original drawing 300, which includes the house 302, the car 304, and the tree 306. The layout 400 also includes a first version 402 (labeled "Version 1"), a second version 404 (labeled "Version 2"), and a third version 406 (labeled "Version 3"). The different versions include same primary objects (e.g., the house 302, the car 304, and the tree 306), where the system modifies one or more of the properties of one or more respective primary objects.

Referring to the first version 402, in this particular example, the system suggests scaling the tree 306 smaller relative to other primary objects, and placing the tree 306 higher in the scene in order to make the tree 306 appear in the background behind the house 302 and appear more distant (e.g., add more depth).

Referring to the second version 404, in this particular example, the system suggests scaling the car 304 smaller relative to other primary objects, and preserving the placement of the car 304 in the foreground and in front of the house 302.

Referring to the third version 406, in this particular example, the system suggests scaling the tree 306 smaller relative to other primary objects, and placing the tree 306 higher in the scene in order to make the tree 306 appear in the background behind the house 302 and appear more distant. The system also suggests scaling the car 304 smaller relative to other primary objects, and preserving the placement of the car 304 in the foreground and in front of the house 302. As shown, the third version 406 includes a combination of the changes to the properties shown in the first version 402 and the second version 404.

For ease of illustration, the layout 400 includes three different drawing versions in addition to the original version. There may be any number of drawing versions, and the number of drawing versions will depend on the particular implementation.

Also, the layout 400 includes drawing versions where changes were made to properties associated with scale and placement of primary objects. There may be any number of property changes and any combination of property changes. The particular properties that the system changes will depend on the particular implementation.

To modify properties of an object, the system changes the values of one or more properties of the object. In various embodiments, the system may use various techniques for applying changes to properties, including scaling, color, texture, etc. The system may achieve desired effects by using various toolkits such as numerical computing toolkits, which provide base image processing techniques. Such toolkits may be used to perform different modifications.

In various embodiments, the system renders previews of one or more alternative versions of the drawing on a display (the drawing screen 102 of FIG. 1), where each version of the drawing shows the drawing with a different combination of modifications applied to the drawing. In some embodiments, the system cycles different versions of the drawing on the display, where each version of the drawing shows different combinations of changes to properties (e.g., scale, depth, etc.). In some embodiments, the system may also simultaneously display versions of the drawing on the screen (e.g., side by side, in a matrix of versions, etc.).

Referring again to FIG. 2, at block 210, the system 100 receives a version selection from the user. The user may accept or reject the suggested versions (with different property changes such as scaling, occlusion, change in color, etc.) in order to improve the drawing. For example, the user may select one of the versions, where the selected version includes desired changes to one or more properties. For example, the user may select the third version 406 of FIG. 4. Alternatively, the user may select the original version of the drawing, rejecting the suggested versions.

In some embodiments, the system may enable the user to make custom changes to one or more versions. For example, if the user likes a brightness change, the system may provide controls in order to enable the user to adjust the brightness. The system may enable the user to select the user-modified version.

In some embodiments, in addition to rendering one or more versions of the drawing on a display, the system indicates the changes made to the drawing to the user. Such indications teach the user how to apply drawing skills for future drawings. In some embodiments, the system indicates to the user which one or more objects have been changed in the image. For example, referring again to the first version 402 of FIG. 4, the system may indicate that the tree 306 has been modified. In some embodiments, the system indicates to the user how the one or more objects have been changed. For example, the system may indicate that the tree 306 has been scaled smaller and moved to the background. The amount of detail that the system provides to the user may vary, depending on the implementation. For example, the system may indication how much smaller the tree 306 was made (e.g., scaled down 50%, etc.) and the particular position the tree 306 was moved to (e.g., pixel placement, etc.).

In various embodiments, such indications of property changes enable the user to understand why the images look different, and enable the user to learn how to improve the user's drawing skills. Such indications may be based on the version selection made. For example, the system may indicate the changes for the selected version but not the other versions.

In some embodiments, in addition to rendering one or more versions of the drawing on a display, the system indicates changes made to the drawing by displaying text that describes the changes. For example, the system may display text stating that the "tree has been made bigger, because the tree is closer in the scene that is drawn." In another example, the system may display text stating that the "house is smaller now, because the house is further away." In some embodiments, the system may also highlight the objects on screen that have been changed, where the highlighted objects correspond to the descriptive text. These indications save the user time in figuring out what objects of the original image have been change and why, which speeds up the process in improving a particular drawing. This also trains the user in the skill of drawing, which saves time drawing and revising drawings thereafter.

In some embodiments, the system may enable the user to preselect multiple versions, where the system displays different versions for preselection. For each preselected versions, the system may indicate which objects are changed and how the objects are changed. For example, referring to the drawing versions of FIG. 4, the system may enable the user to preselect any one or more of the drawing versions. The particular method for selecting (e.g., check boxes, highlighting, etc.) may vary, and will depend on the particular implementation. After the user decides on a version, the user may then select a version for rendering (to become the current version).

At block 212, the system 100 renders the drawing based on the version selection. In some embodiments, the rendered drawing may be referred to as the current drawing. For example, the user selects the third version 406 of FIG. 4, the system renders that drawing version (e.g., on the drawing display 102 of FIG. 1). The system may then enable the user to save the selected version as the current version. The system may also enable the user to further manipulate the new, current version.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 5:
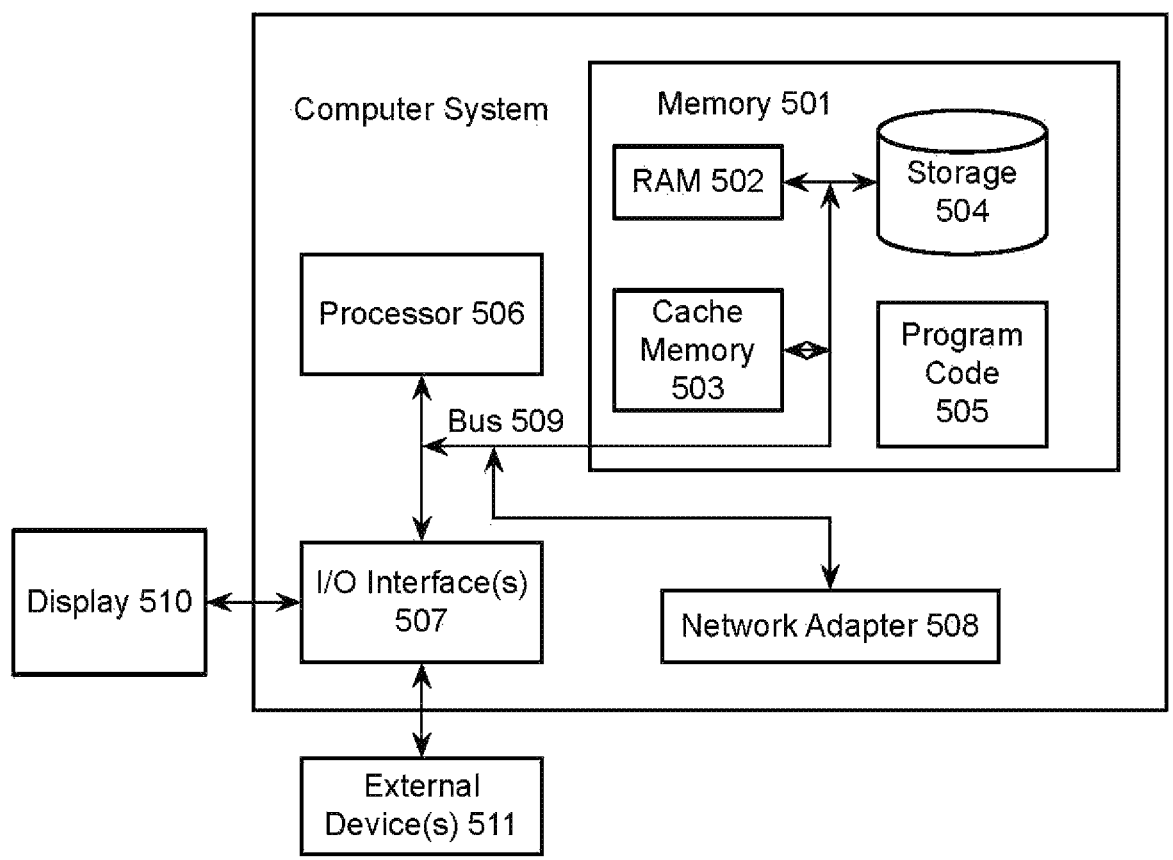
FIG. 5 is a block diagram of an example computer system, which may be used for embodiments described herein.

FIG. 5 is a block diagram of an example computer system 500, which may be used for embodiments described herein. The computer system 500 is operationally coupled to one or more processing units such as processor 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or storage 504, which may include non-volatile storage media or other types of memory. The memory 501 may include at least one program product having a set of at least one program code module such as program code 505 that are configured to carry out the functions of embodiment of the present invention when executed by the processor 506. The computer system 500 may also communicate with a display 510 or one or more other external devices 511 via input/output (I/O) interfaces 507. The computer system 500 may communicate with one or more networks via network adapter 508.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
    at least one processor and a computer readable storage medium having program instructions embodied therewith, the program instructions executable by the at least one processor to cause the at least one processor to perform operations comprising:
    receiving a drawing from a user, wherein the drawing includes a plurality of primary objects;
    recognizing the plurality of primary objects in the drawing;
    determining properties of each primary object of the plurality of primary objects;
    generating at least one alternative version of the drawing, wherein the at least one alternative version has at least one different adjusted property value for a same property of different primary objects of the plurality of primary objects in the drawing, and wherein the same property of the different primary objects is scale;
    generating different descriptions of the same property of each of the primary objects in the drawing and the same property of each of the primary objects in the at least one alternative version of the drawing, wherein each of the different descriptions describes a different adjusted property value for the same property;
    generating one or more suggestions for improvements to the drawing, wherein the one or more suggestions are based on the different descriptions and include the at least one alternative version;
    receiving a version selection from the user, wherein the version selection is from the at least one alternative version; and
    rendering the version selected by the user.

2. The system of claim 1, wherein the at least one processor further performs operations comprising rendering previews of the at least one alternative version of the drawing on a display, and wherein each version of the at least one alternative version of the drawing shows the drawing with a different combination of modifications applied to the drawing.

3. The system of claim 1, wherein the at least one processor further performs operations comprising cycling different versions of the drawing on a display, and wherein each version of the drawing shows different combinations of changes to properties.

4. The system of claim 1, wherein the at least one processor further performs operations comprising:
    indicating changes made to the drawing.

5. The system of claim 1, wherein the at least one processor further performs operations comprising:
    displaying text that describes changes made to the drawing.

6. A computer program product comprising a computer readable storage medium having program instructions embodied therewith, the program instructions executable by at least one processor to cause the at least one processor to perform operations comprising:
    receiving a drawing from a user, wherein the drawing includes a plurality of primary objects;
    recognizing the plurality of primary objects in the drawing;
    determining properties of each primary object of the plurality of primary objects;
    generating at least one alternative version of the drawing, wherein the at least one alternative version has at least one different adjusted property value for a same property of different primary objects of the plurality of primary objects in the drawing, and wherein the same property of the different primary objects is scale;
    generating different descriptions of the same property of each of the primary objects in the drawing and the same property of each of the primary objects in the at least one alternative version of the drawing, wherein each of the different descriptions describes a different adjusted property value for the same property;
    generating one or more suggestions for improvements to the drawing, wherein the one or more suggestions are based on the different descriptions and include the at least one alternative version;
    receiving a version selection from the user, wherein the version selection is from the at least one alternative version; and
    rendering the version selected by the user.

7. The computer program product of claim 6, wherein the at least one processor further performs operations comprising rendering previews of the at least one alternative version of the drawing on a display, and wherein each version of the at least one alternative version of the drawing shows the drawing with a different combination of modifications applied to the drawing.

8. The computer program product of claim 6, wherein the at least one processor further performs operations comprising cycling different versions of the drawing on a display, and wherein each version of the drawing shows different combinations of changes to properties.

9. The computer program product of claim 6, wherein the at least one processor further performs operations comprising:
   indicating changes made to the drawing.

10. The computer program product of claim 6, wherein the at least one processor further performs operations comprising:
   displaying text that describes changes made to the drawing.

11. A computer-implemented method for improving drawings, the method comprising:
   receiving a drawing from a user, wherein the drawing includes a plurality of primary objects;
   recognizing the plurality of primary objects in the drawing;
   determining properties of each primary object of the plurality of primary objects;
   generating at least one alternative version of the drawing, wherein the at least one alternative version has at least one different adjusted property value for a same property of different primary objects of the plurality of primary objects in the drawing, and wherein the same property of the different primary objects is scale;
   generating different descriptions of the same property of each of the primary objects in the drawing and the same property of each of the primary objects in the at least one alternative version of the drawing, wherein each of the different descriptions describes a different adjusted property value for the same property;
   generating one or more suggestions for improvements to the drawing, wherein the one or more suggestions are based on the different descriptions and include the at least one alternative version;
   receiving a version selection from the user, wherein the version selection is from the at least one alternative version; and
   rendering the version selected by the user.

12. The method of claim 11, wherein the at least one processor further performs operations comprising rendering previews of the at least one alternative version of the drawing on a display, and wherein each version of the at least one alternative version of the drawing shows the drawing with a different combination of modifications applied to the drawing.

13. The method of claim 11, wherein the at least one processor further performs operations comprising cycling different versions of the drawing on a display, and wherein each version of the drawing shows different combinations of changes to properties.

14. The method of claim 11, wherein the at least one processor further performs operations comprising:
   indicating changes made to the drawing.

* * * * *